Oct. 7, 1947.    L. E. CHAMPER    2,428,697
METHODS OF CASTING HOT PLASTICS
Filed May 22, 1943
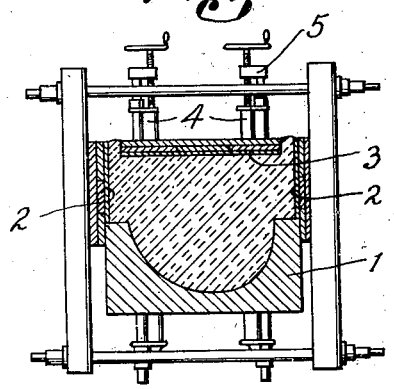
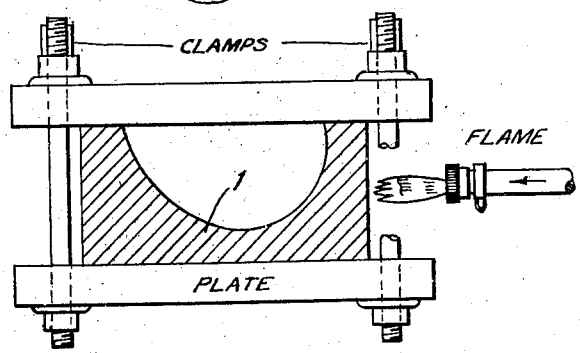
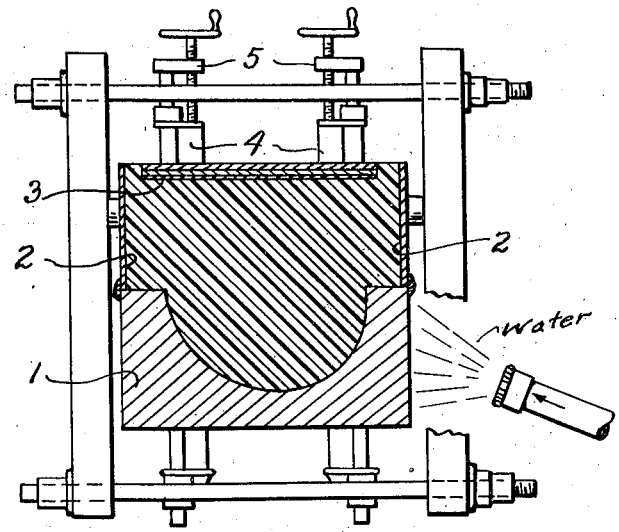
LEON E. CHAMPER
INVENTOR.
BY
ATTORNEY.

Patented Oct. 7, 1947

2,428,697

UNITED STATES PATENT OFFICE 2,428,697

METHODS OF CASTING HOT PLASTICS

Leon E. Champer, Burbank, Calif., assignor, by mesne assignments, to Frank H. Rolapp Application May 22, 1943, Serial No. 488,316

11 Claims. (Cl. 18—55)

This application is a continuation-in-part of Serial No. 430,706, filed February 13, 1942, for improvements in "Thermoplastics and methods and apparatus for hot casting of plastics," and of application Serial No. 456,445, for "Methods and apparatus for forming sheet metal," filed August 26, 1942. I have in application Serial No. 430,706 disclosed plastic compositions suitable for hot casting and methods for casting thermoplastic resins for the production of tools such as dies, jigs, fixtures, and form blocks. I have employed in the production of such tools, thermoplastic resins of high impact strength which are non-brittle and have unique mechanical strength, and will stand high impact stresses.

I have now found that the unique properties of the thermoplastic resin compositions disclosed in my previous application, or when suitably modified to develop their properties, to obtain high impact strength, toughness, and elasticity, permit me to apply these resin compositions to the forming of sheet metal to produce unique and unexpected results in sheet metal forming processes.

The invention disclosed in Serial No. 456,445 also relates to metal forming tools, such as dies, form blocks, and punches made of such resin compositions and to methods of forming metal in which sheet metal is bent, stretched, compressed or drawn by the use of dies, form blocks, or punches. My form of die and punch may be applied both to the double-acting press and to the drop hammer, as well as to the stretch die, and, in fact, to all of the forming procedures previously discussed.

The application of my hot casting method has made possible the production of dies, jigs, fixtures, and form blocks of such perfect contours and dimensions that they require no further machining or treatment to be directly applicable to the work for which they are intended.

The term "casting" as applied to the plastics art is also used in connection with the so-called casting of films or sheets of plastic. In such processes a solution of the plastic in a solvent is spread into sheets and the solvent evaporated to form a film. My invention is not related to such processes and does not employ solvents. In contradistinction to such methods and to thermo-set casting methods, I term my process a "hot casting" method.

I have discovered methods of casting organic fusible or fusible thermoplastic materials which permit me to cast articles with as great a degree of accuracy and with such close tolerances as can be produced by injection molding or even to such close tolerances as can be obtained by the most accurate machining. The castings produced are not only exact dimensionally but I can faithfully reproduce the most minute variations in surface. My method reproduces accurately to the finest tolerances the exact dimensions and surface characteristics of the mold.

Preferably the melt, after pouring into the mold, is cooled primarily by cooling the mold at its outer surfaces.

The mass thus solidifies progressively toward the interior of the melt and that portion of the melt which is furthest away from the cooled surface congeals last.

I may obtain the advantages of my process and apply the principles thereof in hot casting large masses of thermoplastic material into massive molds of high heat mass, such as metallic dies used in metal forming, by heating the die to a temperature above the softening point of the thermoplastic resin, casting the molten resin into the die, and then cooling the die exteriorly in the manner described above. In this procedure the hot plastic material, on contact with the surfaces of the mold, is not congealed but maintained plastic and fluid until the mass of plastic has been introduced into the mold, and then the plastic mass is set by the exterior cooling so that the heat gradient is from the interior of the mass through the walls of the mold or die and, according to the principles of my discovery, accurate conformations are obtainable.

In applying this method to large dies of great weight and in forming dies and punches of several hundred pounds, I have found it more convenient and expeditious to apply the principles of my invention in a novel form. The hot molten plastic is poured into a cold die or metallic mold and the molten plastic is allowed to set by atmospheric cooling while maintaining pressure on the mass of the plastic. Upon congelation of the mass of plastic, it is preferably removed from the mold and the mold is heated to above the softening point of the plastic. The plastic mass is set back into the mold and pressure is applied to the plastic mass to force it into the mold which has been expanded by the heating operation. The hot mold fuses the surface of the plastic mass and perhaps about one or two inches into the interior thereof, and the surface of the mold and the pressure forces the plastic to conform exactly with the mold surface, the mold acting as a large iron to iron out any irregularities. Excess plastic flows from the plastic mass to the exterior thereof. The mold is then cooled rapidly by a stream of water and upon extraction forces the plastic mass to conform. When the mass has been cooled the pressure is removed and a true casting is obtained.

Dies for use in conjunction with punches made from thermoplastic resin may be formed of a rigid non-yielding metal from such splashes by the conventional manner. Thus the splash formed as previously described is used in making a sand mold. A molten zinc aluminum alloy such as is now employed as die material, i. e., a commercial alloy known by the trade-name "Kirksite," is poured in the sand mold and allowed to solidify. The finished die is then ground to size.

Fig. 1 shows the application of my method to casting of a die member by using a metallic die member as a mold.

Fig. 2 shows the heating of the mold prior to the reinsertion of the casting; and Fig. 3 shows the forming of the casting in the reheated die and the cooling of the casting.

Fig. 1 illustrates the method by which the resin punch may be cast into a die such as a zinc-aluminum die. The die illustrated as 1, formed in the above or any other manner, is mounted underneath the heated kettle holding the molten plastic. The walls of the die are built up by metal-lined boards 2 to form a box. The resin composition, such as the ethyl cellulose, hydrogenated castor oil composition, modified by the Superbeckacite, opal wax, and paraffin, previously set forth in detail, is brought gradually to a temperature of 210° C. with constant agitation in the kettle, and after reaching 210° C. is agitated for about 35 minutes. During this heating the resin is made homogeneous and de-aerated, all moisture and air being disengaged. The resin mixture is then allowed to cool with constant agitation to about 170° C. The temperature is sufficiently high above the melting point of the resin to give a viscous but flowable melt. The melt is run into the mold through a funnel whose mouth is maintained immersed in the melt during the running-in of the plastic. The funnel is raised gradually as the resin enters the mold, keeping the mouth of the funnel always submerged in the molten resin. By this procedure the resin is run into the mold and fills the mold, and the box formed by the walls 2, without allowing any air to be folded into or otherwise entrained in the resin.

When the box is filled and has cooled down somewhat, but has not yet solidified, but after a crust forms at the top of the melt to the depth of about an inch, a plate or board 3 is set on top of the resin (see Fig. 1) and clamping boards 4 set on plate 3. Clamps 5 are set on plate. The weight and board press the board into the resin and the resin into the mold during the congealing process, resulting from atmospheric cooling, and the resin is die cast under a pressure into its mold. When the resin has congealed the clamps 5, boards 4, and plate 3 are removed. In cases where there is some clearance between the die and the casting, resulting from shrinkage or as a result of a worn, loose, or damaged die, I proceed as follows:

The molded plastic member is then removed from the die 1. The die is then heated by means of a flame (see Fig. 2) until it has reached a temperature sufficiently above the softening point for the purposes hereinabove described. In the case of ethyl cellulose composition described above, such a temperature is conveniently about 175 to 180° C., for instance 175° C. The heat expands the die. Care must be taken to avoid warping of the mold or die. This may be accomplished by placing the die on a flat solid base and clamping the mold or die to the base. The formed plastic is then set back into the heated die and the boards 2, plates 3, boards 4, and clamps 5 replaced. Uniform pressure on all parts of the casting is desirable. The clamps force the plastic into the expanded die. The hot metal raises the plastic mass in contact therewith to above its softening point to permit the plastic to flow as the casting is forced into the die by the compression pressure of the clamps. The excess plastic flows between the die and the plastic mass and exudes over the edge of the die. When plastic has exuded all around the edge of the die and the die appears full and the clamps have been fully tightened, a stream of water is played upon the exterior of the die and plastic until the die and the plastic have been cooled down to below the softening point of the plastic and preferably to room temperature to set said casting while under compression by the clamps (see Fig. 3). The clamps are then removed.

This procedure causes an ironing of the plastic surfaces and a removal of any irregularities in conformation. In the time necessary to clamp the die the surface plastic material in contact with the hot die is raised above its melting point and the mass of the plastic is raised above its softening point to a depth of about one-fourth to one-half inch, more or less. The contraction of the die on cooling and the applied pressure also act to compress the plastic and die cast the plastic mass. I thus obtain a perfect conformation.

Instead of casting the hot molten plastic into a cold die, reheating and reforming as described above, I may initially heat the die to above the softening point and preferably above the melting point of the plastic. As previously in the case of the ethyl cellulose plastic composition described above, this may be conveniently about 170–180° C., say 175° C. The material is cast and clamped in the die with clamps 30, as previously described. A stream of water is played on the exterior of the plastic mass and the die until the plastic mass has congealed and set. This cooling may conveniently be continued until the mass has been cooled to room temperature to set said casting.

While I have described a particular embodiment of my invention for the purpose of illustration, it should be understood that various modifications and adaptations thereof may be made within the spirit of the invention as set forth in the appended claims.

I claim:

1. A method for casting thermoplastic resin, which comprises forming a melt of said resin, at a temperature sufficiently above the melting point of said resin to obtain a fluid melt, pouring said melt into a mold to form a casting in said mold, cooling said casting to congeal the same, thereafter heating the surfaces of said mold which contact with said casting to a temperature above the softening point of said resin, applying pressure to said casting in said mold, and then cooling said mold and resin while maintaining said pressure.

2. A method for casting thermoplastic resin, which comprises forming a melt of said resin, at a temperature sufficiently above the melting point of said resin to obtain a fluid melt, pouring said melt into a mold to form a casting in said mold, cooling said casting to solidify the same, removing the solid casting from the mold, heating the surfaces of said mold which contact with said casting to a temperature above the softening point of said resin, reinserting the casting into said mold, applying pressure to said casting in said mold, and then cooling said mold and resin while maintaining said pressure.

3. A process for the hot casting of thermoplastic resin, which comprises forming a fluid melt of said resin, casting said resin into a metallic mold, congealing said melt in said mold under pressure, thereafter heating said mold above the softening point of said resin, applying pressure to said casting to form said casting in said mold, and cooling said casting while under said pressure in said mold to set said casting.

4. A process for the hot casting of thermoplastic resin, which comprises forming a fluid melt of said resin, casting said resin into a metallic mold, congealing said melt in said mold under pressure to form a casting, removing said casting, heating said mold above the softening point of said resin, reinserting said casting into the hot mold, applying pressure to said casting to form said casting in said mold, and cooling said casting while under said pressure to set said casting.

5. A method for casting thermoplastic resin, which comprises forming a melt of said resin, at a temperature sufficiently above the melting point of said resin to obtain a fluid melt, pouring said melt into a mold to form a casting in said mold, solidifying the casting in said mold, heating the surfaces of said mold, which contact with said casting, to a temperature above the softening point of said resin, forcing said casting into said mold under pressure to raise the surface temperature of the plastic, in contact with the heated mold surface, and the body of said solidified casting for a short distance from said surface, to a temperature above the softening point of the plastic, displacing excess fluid plastic between the casting and said mold, and then cooling said mold and resin while maintaining said pressure.

6. A method for casting thermoplastic resin, which comprises forming a melt of said resin, at a temperature sufficiently above the melting point of said resin to obtain a fluid melt, pouring said melt into a mold to form a casting in said mold, cooling said casting to solidify the same, removing the solid casting from the mold, heating the surfaces of said mold which contact with said casting to a temperature above the softening point of said resin, reinserting the casting into said mold, forcing said casting into said mold under pressure to raise the surface temperature of the plastic, in contact with the heated mold surface, and the body of said solidified casting for a short distance from said surface to a temperature above the softening point of the plastic, displacing excess fluid plastic between the casting and said mold, and then cooling said mold and resin while maintaining said pressure.

7. A process for the hot casting of thermoplastic resin, which comprises forming a solidified casting in a metallic mold, heating said mold to expand the same, forcing said solidified casting into said expanded mold under pressure, softening the portion of the casting in contact with the hot mold and causing excess plastic to flow between said casting and said mold when said pressure is applied, and cooling said casting and said resin to set said resin casting while maintaining pressure on said casting.

8. A process for the hot casting of thermoplastic resin, which comprises forming a fluid melt of said resin, casting said resin into a metallic mold, congealing said melt in said mold under pressure to form a casting, removing said solidified casting, heating said mold above the softening point of said resin, reinserting said casting into the hot mold, applying pressure to said casting to form said casting in said hot mold, softening the portion of the casting in contact with the hot mold and causing excess plastic to flow between said casting and said die when said pressure is applied, and cooling said casting while in said mold and under said pressure to set said casting.

9. A method for forming a thermoplastic mass, wihch comprises preforming a shaped thermoplastic solid mass, pressing the solid thermoplastic mass into a mold of a shape substantially of the shape of said mass and heated above the softening point of the thermoplastic material of said mass, raising the portion of the thermoplastic mass in contact with the hot mold above the softening point of the thermoplastic material, pressing said solid thermoplastic mass into the mold and flowing the excess thermoplastic material, extruded by said pressure, between said die and the thermoplastic mass, and cooling the mold and thermoplastic to congeal the softened thermoplastic below the softening point of the thermoplastic mass.

10. A process for forming thermoplastic resin casting, which comprises applying pressure to a solidified thermoplastic resin casting in a die whose shape is the same as said casting, the surfaces of said die in contact with said casting being at a temperature above the softening point of the resin, maintaining said surfaces of the die in contact with the resin casting for a time sufficient to raise the contacting resin surfaces to at least the softening point of said resin, the remainder of said resin casting being sufficiently solid for application of pressure to said casting, conforming said casting and the surfaces thereof to said hot die by the said application of pressure to said solidified casting, and subsequently cooling said casting and said die to congeal the resin at said die surfaces and to form the solid casting.

11. A process for the hot casting of thermoplastic resin, which comprises forming a solidified casting in a metallic mold, heating said mold to expand the same and to elevate said mold to a temperature sufficiently high to render the plastic surface of the casting, in contact with the heated mold, fluid applying pressure to said solidified casting in said expanded mold to cause the plastic in contact with said heated mold to undergo flow to conform said plastic with said heated mold, and cooling said mold and said resin to set said resin casting while maintaining pressure on said casting.

LEON E. CHAMPER.

REFERENCES CITED

The following references are of record in the file of this patent:

UNITED STATES PATENTS

| Number | Name | Date |
| --- | --- | --- |
| 1,398,926 | Waite | Nov. 29, 1921 |
| 1,492,906 | Thomson | May 6, 1924 |
| 2,305,362 | Taylor | Dec. 15, 1942 |
| 2,314,378 | Van Rossem | Mar. 23, 1943 |
| 1,993,709 | Chamberlain | Mar. 5, 1935 |
| 1,754,993 | Fenton | Apr. 15, 1930 |
| 2,016,568 | Zinser | Oct. 8, 1935 |
| 2,162,747 | Rector | June 20, 1939 |